(12) United States Patent
Madhani et al.

(10) Patent No.: US 9,292,579 B2
(45) Date of Patent: *Mar. 22, 2016

(54) METHOD AND SYSTEM FOR DOCUMENT DATA EXTRACTION TEMPLATE MANAGEMENT

(71) Applicant: Intuit Inc., Mountain View, CA (US)

(72) Inventors: Sunil Madhani, Mountain View, CA (US); Anu Sreepathy, Bangalore (IN); Mithun U. Shenoy, Bangalore (IN)

(73) Assignee: Intuit Inc., Mountain View, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 14/069,795

(22) Filed: Nov. 1, 2013

(65) Prior Publication Data

US 2015/0127659 A1 May 7, 2015

(51) Int. Cl.
*G06F 17/30* (2006.01)
*G06K 9/00* (2006.01)
*G06K 9/62* (2006.01)

(52) U.S. Cl.
CPC ...... *G06F 17/3053* (2013.01); *G06F 17/30386* (2013.01); *G06K 9/00442* (2013.01); *G06K 9/6255* (2013.01)

(58) Field of Classification Search
CPC .......... G06F 17/3053; G06F 17/30386; G06F 17/30699; Y10S 707/99933; G06K 9/00442; G06K 9/6255
USPC ....................................................... 707/748
See application file for complete search history.

(56) References Cited

U.S. PATENT DOCUMENTS

| | | | | |
|---|---|---|---|---|
| 6,154,737 A * | 11/2000 | Inaba | ............... | G06F 17/3069 707/696 |
| 6,778,703 B1 | 8/2004 | Zlotnick | | |
| 7,149,347 B1 | 12/2006 | Wnek | | |
| 7,469,270 B1 * | 12/2008 | Kirkpatrick | ........... | G06F 17/243 709/203 |
| 7,624,053 B1 * | 11/2009 | Molotsi | .................. | G06Q 40/00 705/35 |
| 2007/0168382 A1 | 7/2007 | Tillberg et al. | | |
| 2010/0161460 A1 | 6/2010 | Vroom et al. | | |
| 2011/0314041 A1 * | 12/2011 | Drucker | ................. | G06Q 30/02 707/769 |
| 2013/0091162 A1 * | 4/2013 | Lewak | ............. | G06F 17/30392 707/769 |
| 2014/0089302 A1 * | 3/2014 | Lapir | .................. | G06F 17/3053 707/723 |
| 2015/0078671 A1 * | 3/2015 | van Deventer | ..... | G06K 9/00449 382/217 |

OTHER PUBLICATIONS

Madhani et al., "Method and System for Managing User Contributed Data Extraction Templates Using Weighted Ranking Score Analysis," U.S. Appl. No. 14/069,871, filed Nov. 1, 2013.

* cited by examiner

*Primary Examiner* — Thanh-Ha Dang
(74) *Attorney, Agent, or Firm* — Hawley Troxell Ennis & Hawley LLP; Philip McKay

(57) ABSTRACT

User acceptance of a given data extraction template and the number of data fields that the data extraction template can extract accurately is used to calculate data extraction template ranking, or a ranking score, to be associated with the data extraction template. Then the data extraction template having the highest data extraction template ranking score is used in a first attempt to extract data from a source documents of the source document type associated with the data extraction templates. As more data extraction templates associated with a given source document type are received, data extraction template ranking scores are updated/modified, and, in one example, the data extraction templates having the lowest data extraction template ranking scores are detected/eliminated.

24 Claims, 3 Drawing Sheets

METHOD AND SYSTEM FOR DOCUMENT DATA EXTRACTION TEMPLATE MANAGEMENT

BACKGROUND

While the use of data management systems has increased significantly over the past decade, one long standing problem, and barrier to entry, for providers of data management systems is how to provide potential users of the data management systems the functionality and features of the data management systems, without requiring significant user data entry, and/or other significant user interaction, with the data management systems.

Current data management systems include, but are not limited to, any of the following: a computing system implemented, or Internet-based, personal and/or business financial transaction management system; a computing system implemented, or Internet-based, personal and/or business financial management system; a computing system implemented, or Internet-based, personal and/or business asset management system; a computing system implemented, or Internet-based, personal and/or business accounting system; a computing system implemented, or Internet-based, point of sale system; a computing system implemented, or Internet-based, personal and/or business tax preparation system; a computing system implemented, or Internet-based, healthcare management system; and/or any of the numerous computing system implemented, or Internet-based, financial management systems known to those of skill in the art.

Efforts to minimize user data entry associated with the data management systems is often complicated by the problem of data extraction from various user documents. Data extraction from documents, both structured and unstructured, has inherent and long standing problems and complications that make potential users of many data systems hesitant to use data management systems. One current method of data extraction is to generate various data extraction templates used to identify data fields within documents.

A data extraction template contains location and contextual details of where data fields of importance, i.e., data fields containing desired data are present in the document. The data extraction template is then used as a map to obtain the desired data, i.e., extract the desired data. Since each type of source document includes desired data in different locations within the source document, a specific data extraction template typically must be generated and used with each specific type of source document.

However, it is not practical for a provider of a data management system to create data extraction templates for every type and format of document the data management system may encounter. Consequently, in many cases, the provider of a data management system may encourage users of the data management system to contribute/take part in the creation of data extraction templates for unknown document formats, such as Tax documents, that often have a long tail of unstructured formats.

While this user contribution approach can be effective, the user contribution is entirely voluntary and a single user may not contribute everything that is necessary to create a full data extraction template which can extract all required fields/desired data in a given document. In addition, it may also be the case that not all fields are present in the document that the user is using as a reference for data extraction template creation. For example one invoice from a given vendor for which a user is creating a data extraction template may not have a "terms" field while another invoice, from the same vendor, may have a "terms" field.

As data extraction templates are created for the same vendor, and/or source document type, it becomes imperative to manage these data extraction templates, identify the most relevant data extraction templates, and discard redundant, and/or outdated, data extraction template data. However, currently, there is no efficient, effective, and user friendly means or mechanism for doing this.

SUMMARY

In accordance with one embodiment, a process for document data extraction template management leverages user acceptance of a given data extraction template and the number of data fields that the data extraction template can extract accurately to calculate a data extraction template rank, or score, to be associated with the data extraction template.

In accordance with one embodiment, data extraction template data representing a data extraction template associated with a specific source document type is received/obtained. In one embodiment, a field hit count number associated with the data extraction template is determined. In one embodiment, the field hit count number indicates the number of data fields from which data can be extracted from a specific source document type using the data extraction template.

In one embodiment, the data extraction template is then used to extract data from received source documents of the specific source document type and the acceptance or rejection of data extracted from received source documents of the specific source document type using the data extraction template is monitored. In one embodiment, a data acceptance count to be associated with the data extraction template is then determined indicating the number of times the data extracted from received source documents of the specific source document type using the data extraction template is accepted.

In one embodiment, the field hit count number associated with the data extraction template and the data acceptance count associated with the data extraction template is processed and transformed into data extraction template ranking score data for the data extraction template. In one embodiment, the data extraction template data and the data extraction template ranking score data for the data extraction template are then correlated and stored as ranked data extraction template data.

In one embodiment, ranked data extraction template data associated with two or more data extraction templates associated with the specific source document type are then aggregated and stored for use with new source documents of the specific source document type.

BRIEF DESCRIPTION OF THE DRAWINGS

Common reference numerals are used throughout the FIG.s and the detailed description to indicate like elements.

Figure 1:
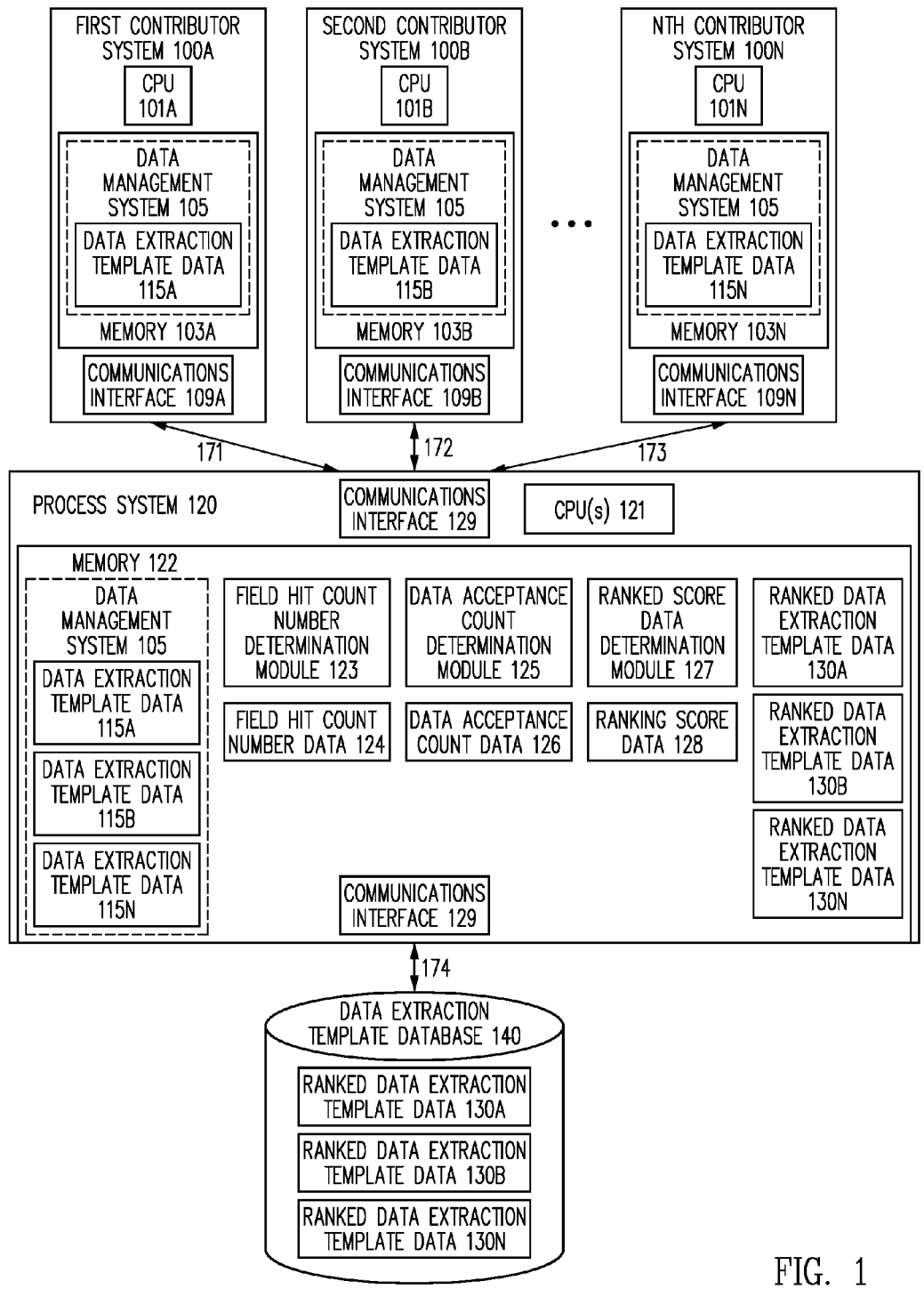
FIG. 1 is a block diagram of an exemplary hardware architecture for implementing one embodiment.

One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for document data extraction template management includes a process for document data extraction template management implemented by one or more processors associated with one or more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein.

In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wired network; a wireless network; a wireless and wired combination network; a satellite network; a cable network; any combination of different network types; or any other system capable of allowing communication between two or more computing systems, whether available or known at the time of filing or as later developed.

In accordance with one embodiment, the process for document data extraction template management is part of, linked to, or otherwise associated with, one or more data and/or financial management systems used by one or more individuals/users.

Herein, a financial management system can be, but is not limited to, any data management system implemented on a computing system and/or accessed through a network that processes data, including but not limited to, financial data, tax data, etc., from one or more sources.

Herein, the term "financial management system" can denote, but is not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filling or as developed later.

In one embodiment, individuals employing a data management system, such as, but not limited to, a financial management system, are provided the capability to create and/or modify data extraction templates used to extract data from specific types of source documents. In one embodiment, individual/user contribution for creating data extraction templates for use in extracting desired data from new/unknown source document types, or to extract new data from known source document types, is solicited by a provider of a data management system associated with the system and method for document data extraction template management.

In various embodiments, the specific types of source documents include, but are not limited to, invoices, bills, and/or account statements from specific parties and/or financial institutions; receipts from vendors, merchants, and/or financial institutions; various tax forms, and/or tax related documents, related to federal, state, and/or local taxes; various healthcare related documents and forms associated with specific healthcare service providers and/or healthcare insurance providers; various income and/or expense statements associated with specific employers and/or financial institutions; and/or any other source documents as discussed herein, and/or as known in the art at the time of filing, and/or as developed/made available after the time of filing that include desired data that is to be extracted using a data extraction template for use by a data management system.

In one embodiment, it is assumed that the data management system that needs desired data from source documents knows the type of desired data it expects. For example, it is assumed a small business financial management system's import invoice feature knows that it needs due date data, amount due data, etc.

In one embodiment, baseline template data associated with the extraction of data from specific types of source documents is provided and used to create initial, or incomplete, data extraction templates that are then modified by a contributing user, i.e., a user of the data management system who is providing, or modifying, data extraction templates, of a data management system associated with the system and method for document data extraction template management.

Herein the terms "individual" and "user" are used interchangeably and include, but are not limited to, any individual party and/or entity as discussed herein, and/or as defined in the art at the time of filing, and/or as defined after the time of filing.

Herein the terms "contributing individual" and "contributing user" are used interchangeably and include, but are not limited to, any individual party and/or entity as discussed herein, and/or as defined in the art at the time of filing, and/or as defined after the time of filing, who provides data extraction template data representing either new data extraction template data or data extraction template data representing a modification to existing data extraction template data, and/or an existing data extraction template.

In one embodiment, a contributing user provides data extraction template data through a user interface provided by the data management system, and/or the process for document data extraction template management. In one embodiment, through the user interface, a contributing user marks areas and/or fields of the source document and identifies the desired data contained in those areas or fields, and/or modifies and/or adds data fields and/or areas to an existing, or initial, data extraction template. In one embodiment, when a contributing user marks areas/fields in a source document, or makes changes to an existing data extraction template, this data is used to generate data extraction template data that contains data indicating the location and contextual information of data in the source document of the specific source document type.

In one embodiment, once data extraction template data is received from one or more contributing users, the number of data fields within the specific type of source document that the data extraction template is known to be able to extract is determined and recorded; in one embodiment as a field hit count number associated with the data extraction template represented by the data extraction template data. In various embodiments, the field hit count number associated with a data extraction template provides an initial indication of how much of the desired data can be obtained from a source document of the associated source document type using the data extraction template. Therefore, the field hit count number associated with a data extraction template is a measure of the usefulness of the data extraction template represented by the data extraction template data. In addition, the use of the field hit count number takes into consideration the fact that a contributing user providing the data extraction template data may not have contributed all required fields for creation of the data extraction template.

In one embodiment, once created, the data extraction templates represented by the data extraction template data are categorized according to the specific document type associated with the data extraction templates, and for which the data extraction templates are to be used to extract desired data from source documents of the specific source document type. In one embodiment, the data extraction templates associated with a specific source document type are then aggregated and stored in a data extraction template database according to the category assigned to the data extraction templates, e.g., according to the source document type associated with the data extraction templates.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

As discussed below, in various embodiments, when a new source document of a specific source document type is received, the data extraction template database is searched to find at least one data extraction template associated with the specific source document type of the new source document.

In one embodiment, once new or modified data extraction template data is received representing a new or modified data extraction template for use with a specific source document type, and a new source document of the specific source document type is received, the data extraction template is applied to the new source document, i.e., desired data is extracted from the new source document using the new or modified data extraction template.

In one embodiment, when desired data is extracted using the data extraction template, the extracted desired data is presented to a user of the data extraction template for approval and/or acceptance. In one embodiment, the instances of acceptance or rejection of desired data extracted from a source document using the new or modified data extraction template is monitored and recorded.

In one embodiment, based on the acceptance or rejection data resulting from the monitoring of the acceptance or rejection of desired data extracted from source documents using the new or modified data extraction template, a data acceptance count to be associated with the data extraction template is determined. In one embodiment, when a data extraction template is created, i.e., when new data extraction template data is received, the data acceptance count associated with the new data extraction template is recorded as one, or some other defined initial value.

In one embodiment, each time the entirety of the desired data extracted from a source document of the specific source document type using the new or modified data extraction template, or any data extraction template, is accepted by a user of the data extraction template, the data acceptance count associated with that data extraction template is increased; in one embodiment by one point for each instance where the extracted desired data is accepted.

In one embodiment, if a user of an existing data extraction template contributes new data extraction template data indicating a new field, or other modification, to the existing data extraction template, new data extraction template data is generated representing a new data extraction template including the original data extraction template data and the user modifications to the original data extraction template. In one embodiment, the modified or new data extraction template is then assigned a new field hit count number reflecting any added data fields that can be extracted using the new data extraction template and the user acceptance count associated with the new data extraction template is set to one, or another initial use value.

In one embodiment, data representing the field hit count number associated with a data extraction template and data representing the data acceptance count associated with a data extraction template are processed and combined to transform the field hit count number and acceptance count data associated with the data extraction template into ranking score data to be associated with the data extraction template.

Given that the field hit count number associated with a given data extraction template is representative of the ability of the given data extraction template to extract the desired data from associated source document type, and that the acceptance count data associated with a given data extraction template is representative of the quality of data extraction performed by the given data extraction template, the ranking score data associated with a given data extraction template is a dynamic indication of how effective and accurate the given data extraction template is for extracting desired data from a specific type of source document.

In one embodiment, when data extraction template data representing two or more data extraction templates associated with a given specific source document type is received, the ranking score data associated with data extraction templates is used to determine which of the data extraction templates is applied/used with new source documents of the specific document type, at least initially.

In one embodiment, when a new source document of a specific source document type is received, the data extraction template database is searched to identify the one or more data extraction templates categorized as being associated with the specific source document type of the new source document. In one embodiment, the new source document is matched recursively against the data extraction templates having the highest ranking scores until the number of data fields that can be extracted for the new source document match the field hit count for the data extraction template.

In one embodiment, the extracted desired data is then presented to the data extraction template user for acceptance or rejection. In various embodiments, and in cases where multiple values for a particular field are detected, all such desired data are presented to the data extraction template user in a combo box or table. Then the data extraction template user is asked to select the correct desired data and when the data extraction template user selects the correct desired data, the data acceptance count for the corresponding data extraction template is increased, thereby also increasing the ranking score associated with the data extraction template.

Given that the data ranking score associated with a given data extraction template is increased each time the data acceptance count for the data extraction template is increased, and that the data field count number associated with a given data extraction template can also be increased by the modification mechanisms discussed above, the result of the application of the method and system for document data extraction template management is a dynamic ranking system of all the data extraction templates associated with a given source document type.

In one embodiment, as the ranking score associated with multiple data extraction templates associated with a specific source document type changes, the data extraction templates with the lowest data ranking scores are determined to be no longer relevant. In one embodiment, these data extraction templates with the lowest data ranking scores are then discarded.

As one specific example, in one embodiment, a threshold number of data extraction templates associated with a specific source document type is defined and once the number of data extraction templates associated with the specific source document type in the data extraction template database reaches this threshold number, data extraction templates having the lowest ranking score are deleted from the data extraction template database as new data extraction template data is received.

In this way, the number of data extraction templates, and the amount of data extraction template data, that is stored is automatically managed so that memory and data processing is not expended on irrelevant, or outdated, data extraction template data.

Using the system and method for document data extraction template management discussed herein, user-contribution is leveraged to not only create data extraction templates, but user contribution and usage is also used to rank and manage all data extraction templates associated with a specific source document type. As a result, using the system and method for document data extraction template management discussed herein, the efficiency of the data extraction template creation, application, and management is dynamic and constantly improving as more data management system users join the system and more and more data extraction template data is received.

Hardware System Architecture

FIG. 1 is a block diagram of an exemplary hardware architecture for implementing one embodiment of a process for document data extraction template management, such as exemplary process 200 (FIG. 2) discussed herein.

FIG. 1 includes contributor systems 100A, 100B, through 100N, e.g., "N" representative computing systems associated with "N" contributing users who provide data extraction template data 115A, 115B, through 115N; process system 120, e.g., a computing system associated with a provider of a process for document data extraction template management; a data extraction template database 140, e.g., a database including data extraction template data; and communication channels 171, 172, 173, and 174.

As seen in FIG. 1, contributor systems 100A, 100B, through 100N include processor/Central Processing Units (CPUs) 101A, 101B, through 101N, memories 103A, 103B, through 103N, and communication interfaces 109A, 109B, through 109N.

In some embodiments, memories 103A, 103B, through 103N include all or part of data management system 105. In various embodiments, data management system 105 is any data management system as discussed herein, and/or as known/available in the art at the time of filing, and/or as developed/made available after the time of filing. In one embodiment, data management system 105 is a computing system implemented financial management system.

In some embodiments, memories 103A, 103B, through 103N include all or part of data extraction template data 115A, 115B, through 115N. As discussed below, the contributing individuals associated with contributor systems 100A, 100B, through 100N utilizing data management system 105 are provided the capability, and encouraged, to provide data extraction template data 115A, 115B, through 115N to data management system 105

In one embodiment, data extraction template data 115A, 115B, through 115N is then provided to process system 120 through data management system 105, communications interfaces 109A, 109B, through 109N, communications channels 171, 172, and 173, and communications interface 129.

Contributor systems 100A, 100B, through 100N, as shown in FIG. 1, are representative of any number "N" computing systems associated with one or more individuals. As discussed herein data extraction template data 115A, 115B, through 115N in FIG. 1, can be obtained from a single individual and/or a large number of individuals, even as many as thousands or hundreds of thousands or millions of individuals. Consequently, in various embodiments, contributor systems 100A, 100B, through 100N can be representative of hundreds of thousands, or even millions, of contributor systems and/or data extraction template data 115A, 115B, through 115N can be representative data extraction template data received from hundreds of thousands, or even millions, of individuals. Consequently, the three representative contributor systems 100A, 100B, through 100N are shown in FIG. 1 for illustrative purposes and are not limiting to the claims presented below.

In various embodiments, contributor systems 100A, 100B, through 100N can be any computing system discussed herein, and/or as known in the art at the time of filing, and/or as developed after the time of filing.

In various embodiments, contributor systems 100A, 100B, through 100N may further include standard interface devices such as a keyboard (not shown), a mouse (not shown), a printer (not shown), as well as, one or more standard input/output (I/O) devices (not shown), such as a tap or touch screen device, voice data entry via microphone or other audio detection device, compact disk (CD) or Digital Video Disc (DVD) drive, floppy disk drive, or other digital or waveform port, or other device capable of inputting data to, and outputting data from, contributor systems 100A, 100B, through 100N, whether available or known at the time of filing or as later developed.

Process system 120 can be any computing system as discussed herein, and/or as known in the art at the time of filing, and/or as developed thereafter, that includes components that can execute all, or part, of a process for document data extraction template management in accordance with at least one of the embodiments as described herein.

In one embodiment, process system 120 includes one or more Central Processing Units (CPUs) 121, memory 122, and communications interface 129.

In one embodiment, memory 122 includes all, or part, of data management system 105. In some embodiments, data management system 105 is any data management system as discussed herein, and/or as known/available in the art at the time of filing, and/or as developed/made available after the time of filing. In one embodiment, data management system 105 is a web-based, or server implemented financial management system.

In one embodiment, memory 122 includes all, or part, of data extraction template data 115A, 115B, through 115N received from contributor systems 100A, 100B, through 100N, and through data management system 105.

In one embodiment, memory 122 includes all, or part, of field hit count number determination module 123, which generates field hit count number data 124 for each of data extraction template data 115A, 115B, through 115N; data acceptance count determination module 125, which generates data acceptance count data 126 for each of data extraction template data 115A, 115B, through 115N; ranking score data determination module 127, which transforms field hit count number data 124 and data acceptance count data 126 for each of data extraction template data 115A, 115B, through 115N into ranking score data 128 for each of data extraction template data 115A, 115B, through 115N, and thereby generates ranked data extraction template data 130A, ranked data extraction template data 130B, through ranked data extraction template data 130N, associated with each of data extraction template data 115A, 115B, through 115N, respectively.

Process system 120 may further include standard interface devices such as a keyboard (not shown), a mouse (not shown), a printer (not shown), as well as, one or more standard input/output (I/O) devices (not shown), such as a such as a tap or touch screen device, voice data entry via microphone or other audio detection device, compact disk (CD) or Digital Video Disc (DVD) drive, floppy disk drive, or other digital or waveform port, or other device capable of inputting data to, and outputting data from, process system 120, whether available or known at the time of filing or as later developed.

Data extraction template database 140 can be any database, or data store, as discussed herein, and/or as known in the art at the time of filing, and/or as developed thereafter, that includes components that can execute all, or part, of a process for document data extraction template management in accordance with at least one of the embodiments as described herein.

In one embodiment, data extraction template database 140 includes all, or part, of ranked data extraction template data 130A, ranked data extraction template data 130B, through ranked data extraction template data 130N, as received form process system 120 via communications interface 129 and communications channel 174.

In one embodiment, any, or all, of communications channels 171, 172, 173, and 174 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, contributor systems 100A, 100B, through 100N, provider system 120, and/or data extraction template database 140 are part of a cloud computing environment.

In accordance with one embodiment, the process for document data extraction template management is part of, linked to, or otherwise associated with, one or more data and/or financial management systems used by one or more individuals/users, such as data management system 105.

In one embodiment, individuals, such users associated with contributor systems 100A, 100B, through 100N, employing data management system 105 are provided the capability to create and/or modify data extraction templates used to extract data from specific types of source documents. In one embodiment, individual/user contribution for creating data extraction templates for use in extracting desired data from new/unknown source document types, or to extract new data from known source document types, is solicited by a provider of data management system 105.

In one embodiment, contributing users provide data extraction template data 115A, 115B, through 115N through a user interface provided by data management system 105, and/or the process for document data extraction template management (not shown). In one embodiment contributing users mark areas and/or fields of the source document and identify the desired data contained in those areas or fields, and/or modify and/or add data fields and/or areas to an existing, or initial, data extraction template. In one embodiment, when a contributing user marks areas/fields in a source document, or makes changes to an existing data extraction template, this data is used to generate data extraction template data 115A, 115B, through 115N that contains data indicating the location and contextual information of data in the source document of the specific source document type.

In one embodiment, data extraction template data 115A, 115B, through 115N is received from one or more contributing users at process system 120, in one embodiment, through data management system 105 and/or communications channels 171, 172, and 173. In one embodiment, field hit count number determination module 123 then determines the number of data fields within the specific type of source document that the data extraction templates of data extraction template data 115A, 115B, through 115N are known to be able to extract, in FIG. 1 represented by field hit count number data 124 associated with the data extraction templates represented by data extraction template data 115A, 115B, through 115N. In various embodiments, the field hit count number associated with a data extraction templates of field hit count number data 124 provides an initial indication of how much desired data can be obtained from a source document of the associated source document type (not shown) using the data extraction templates represented by data extraction template data 115A, 115B, through 115N, respectively. Therefore, the field hit count numbers associated with the data extraction templates represented by data extraction template data 115A, 115B, through 115N is a measure of the usefulness of the data extraction templates represented by data extraction template data 115A, 115B, through 115N.

In one embodiment, once created, the data extraction templates represented by data extraction template data 115A, 115B, through 115N are categorized according to the specific document type associated with the data extraction templates, and for which the data extraction templates are to be used to extract desired data from source documents of the specific source document type. In one embodiment, the data extraction templates represented by data extraction template data 115A, 115B, through 115N associated with a specific source document type are then aggregated and stored in data extraction template database 140 according to the category assigned to the data extraction templates, e.g., according to the source document type associated with the data extraction templates.

As discussed below, in various embodiments, when a new source document of a specific source document type (not shown) is received, data extraction template database 140 is searched to find at least one data extraction template associated with the specific source document type of the new source document.

In one embodiment, once new or modified data extraction template data is received representing a new or modified data extraction template for use with a specific source document type, and a new source document of the specific source document type is received, the data extraction template is applied to the new source document, i.e., desired data is extracted from the new source document using the new or modified data extraction template.

In one embodiment, when desired data is extracted using the data extraction template, the extracted desired data is presented to a user of the data extraction template for approval and/or acceptance. In one embodiment, the instances of acceptance or rejection of desired data extracted from a source document using the data extraction templates represented by data extraction template data 115A, 115B, through 115N is monitored and recorded using data count determination module 125.

In one embodiment, based on the analysis of data count determination module 125 data acceptance count data 126 is generated and associated with the respective data extraction templates represented by data extraction template data 115A, 115B, through 115N. In one embodiment, when a data extraction template is created, i.e., when new data extraction template data is received, the data acceptance count associated with the new data extraction template is recorded as one, or some other defined initial value.

In one embodiment, each time the entirety of the desired data extracted from a source document of the specific source document type using the data extraction templates represented by data extraction template data 115A, 115B, through 115N is accepted by a user of the data extraction template, data count determination module 125 increases the data acceptance count data of data acceptance count data 126 associated with that data extraction template; in one embodiment by one point for each instance where the extracted desired data is accepted.

In one embodiment, if a user of an existing data extraction template contributes new data extraction template data indicating a new field, or other modification, to the existing data extraction template, new data extraction template data is generated representing a new data extraction template including the original data extraction template data and the user modifications to the original data extraction template. In one embodiment, the modified or new data extraction template is then assigned a new field hit count number reflecting any added data fields that can be extracted using the new data extraction template and the user acceptance count associated with the new data extraction template is set to one, or another initial use value.

In one embodiment, field hit count number data 124 associated with each of the data extraction templates represented by data extraction template data 115A, 115B, through 115N and data acceptance count data 126 associated with each of the data extraction templates represented by data extraction template data 115A, 115B, through 115N are processed and combined by ranking score data determination module 127 to transform field hit count number data 124 associated with each of the data extraction templates represented by data extraction template data 115A, 115B, through 115N and data acceptance count data 126 associated with each of the data extraction templates represented by data extraction template data 115A, 115B, through 115N into ranking score data 128 to be associated with each of the data extraction templates represented by data extraction template data 115A, 115B, through 115N.

Given that the field hit count number associated with a given data extraction template is representative of the ability of the given data extraction template to extract the desired data from associated source document type, and that the acceptance count data associated with a given data extraction template is representative of the quality of data extraction performed by the given data extraction template, the ranking score data associated with a given data extraction template is a dynamic indication of how effective and accurate the given data extraction template is for extracting desired data from a specific type of source document.

In one embodiment, the data extraction template data 115A, 115B, through 115N and the ranking score data 128 associated with each of the data extraction templates represented by data extraction template data 115A, 115B, through 115N are stored as ranked extraction template data 130A, and ranked extraction template data 130B through ranked extraction template data 130N, respectively. In one embodiment, ranked extraction template data 130A, and ranked extraction template data 130B through ranked extraction template data 130N are then stored in data extraction template database 140.

In one embodiment, when a new source document of a specific source document type (not shown) is received, data extraction template database 140 is searched to identify the one or more data extraction templates categorized as being associated with the specific source document type of the new source document, in this example, ranked extraction template data 130A, and ranked extraction template data 130B through ranked extraction template data 130N. In one embodiment, the new source document is matched recursively against the data extraction templates of ranked extraction template data 130A, and ranked extraction template data 130B through ranked extraction template data 130N having the highest ranking scores until the number of data fields that can be extracted for the new source document match the field hit count for the data extraction template.

In one embodiment, the extracted data is then presented to the data extraction template user for acceptance or rejection. In various embodiments, and in cases where multiple values for a particular field are detected, i.e., duplicate or redundant desired data is obtained, all such desired data are presented to the data extraction template user in a combo box or table (not shown). Then the data extraction template user is asked to select the correct desired data and when the data extraction template user selects the correct desired data, the data acceptance count for the data extraction template is increased, thereby also increasing the ranking score associated with the data extraction template.

Given that the data ranking score associated with a given data extraction template is increased each time the data acceptance count for the data extraction template is increased, and that the data field count number associated with a given data extraction template can also be increased by the modification mechanisms discussed above, the result of the application of the method and system for document data extraction template management is a dynamic ranking system of all the data extraction templates associated with a given source document type.

In one embodiment, as the ranking score associated with multiple data extraction templates associated with a specific source document type, such as ranked extraction template data 130A, and ranked extraction template data 130B through ranked extraction template data 130N, changes, the data extraction templates with the lowest data ranking scores are determined to be no longer relevant. In one embodiment, these data extraction templates with the lowest data ranking scores are then discarded.

As one specific example, in one embodiment, a threshold number of data extraction templates associated with a specific source document type is defined and once the number of data extraction templates associated with the specific source document type in the data extraction template database reaches this threshold number, data extraction templates having the lowest ranking score are deleted from the data extraction template database as new data extraction template data is received.

In this way, the number of data extraction templates, and the amount of data extraction template data, that is stored is automatically managed so that memory and data processing is not expended on irrelevant, or outdated, data extraction template data.

Those of skill in the art will readily recognize that the components shown in FIG. 1, and their respective sub-components, are shown for illustrative purposes only and that architectures with more or fewer components can implement, and benefit from, the invention. In addition, the particular type of, and configuration of, contributor systems 100A, 100B, through 100N, provider system 120, and/or data extraction template database 140 are not relevant.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a process for document data extraction template management leverages user acceptance of a given data extraction template and the number of data fields that the data extraction template can extract accurately to calculate a data extraction template rank, or score, to be associated with the data extraction template.

In accordance with one embodiment, data extraction template data representing a data extraction template associated with a specific source document type is received/obtained. In one embodiment, a field hit count number associated with the data extraction template is determined. In one embodiment, the field hit count number indicates the number of data fields from which data can be extracted from a specific source document type using the data extraction template.

In one embodiment, the data extraction template is then used to extract data from received source documents of the specific source document type and the acceptance or rejection of data extracted from received source documents of the specific source document type using the data extraction template is monitored. In one embodiment, a data acceptance count to be associated with the data extraction template is then determined indicating the number of times the data extracted from received source documents of the specific source document type using the data extraction template is accepted.

In one embodiment, the field hit count number associated with the data extraction template and the data acceptance count associated with the data extraction template is processed and transformed into data extraction template ranking score data for the data extraction template. In one embodiment, the data extraction template data and the data extraction template ranking score data for the data extraction template are then correlated and stored as ranked data extraction template data.

In one embodiment, ranked data extraction template data associated with two or more data extraction templates associated with the specific source document type are then aggregated and stored for use with new source documents of the specific source document type.

Figure 2:
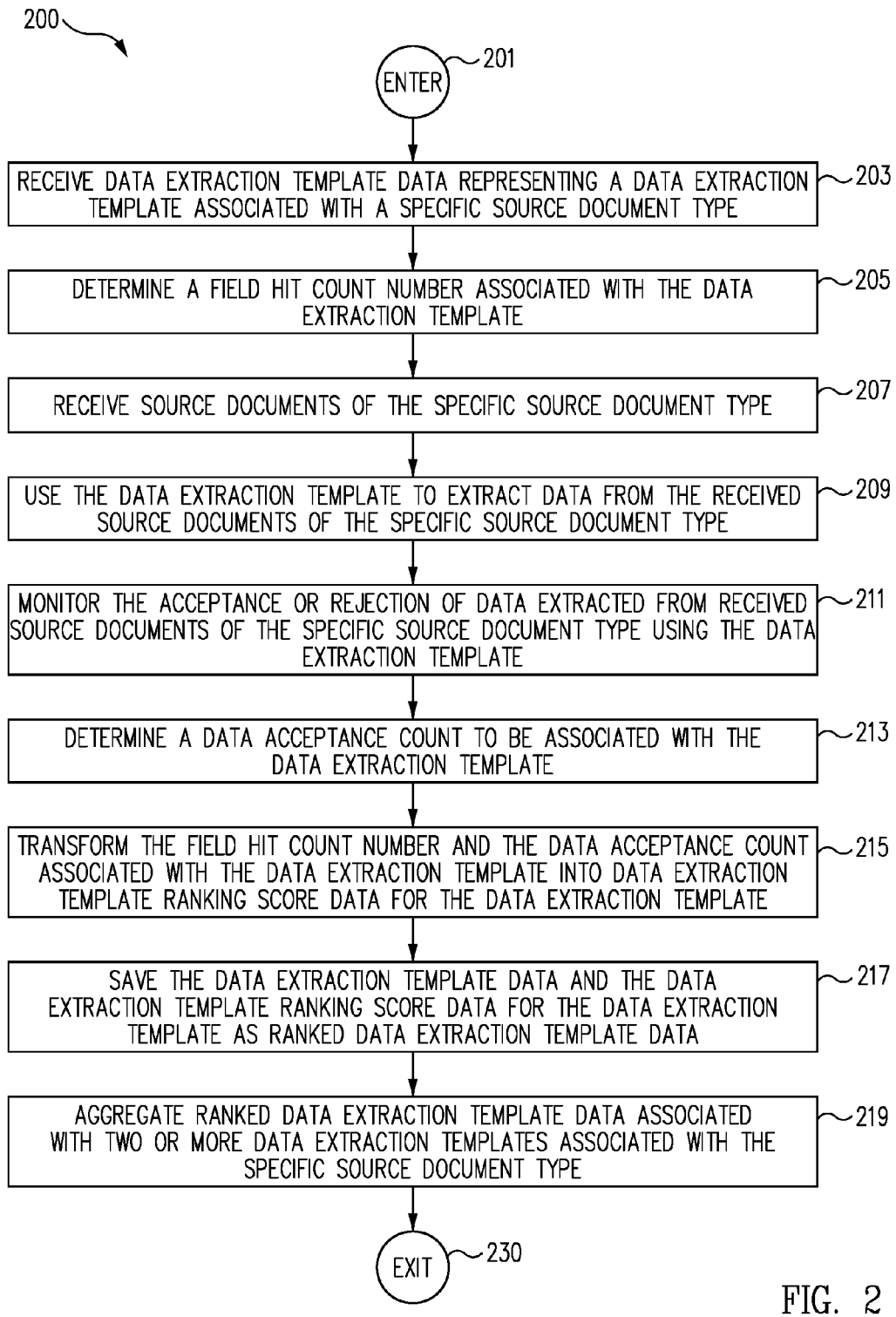
FIG. 2 is a flow chart depicting a process for document data extraction template management in accordance with one embodiment.

FIG. 2 is a flow chart depicting a process 200 for document data extraction template management in accordance with one embodiment. In one embodiment, process 200 for document data extraction template management begins at ENTER OPERATION 201 and process flow proceeds to RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203.

In accordance with one embodiment, process 200 for document data extraction template management is part of, linked to, or otherwise associated with, one or more data and/or financial management systems used by one or more individuals/users.

In one embodiment, individuals employing a data management system, such as, but not limited to, a financial management system, are provided the capability to create and/or modify data extraction templates used to extract data from specific types of source documents. In one embodiment, individual/user contribution for creating data extraction templates for use in extracting desired data from new/unknown source document types, or to extract new data from known source document types, is solicited by a provider of a data management system associated with process 200 for document data extraction template management.

In various embodiments, the specific types of source documents include, but are not limited to, invoices, bills, and/or account statements from specific parties and/or financial institutions; receipts from vendors, merchants, and/or financial institutions; various tax forms, and/or tax related documents, related to federal, state, and/or local taxes; various healthcare related documents and forms associated with specific healthcare service providers and/or healthcare insurance providers; various income and/or expense statements associated with specific employers and/or financial institutions; and/or any other source documents as discussed herein, and/or as known in the art at the time of filing, and/or as developed/made available after the time of filing that include desired data that is to be extracted using a data extraction template for use by a data management system.

In one embodiment, it is assumed that the data management system that needs desired data from source documents knows the type of desired data it expects. For example, it is assumed a small business financial management system's import invoice feature knows that it needs due date data, amount due data, etc.

In one embodiment, baseline template data associated with the extraction of data from specific types of source documents is provided and used to create initial, or incomplete, data extraction templates that are then modified by a contributing user, i.e., a user of the data management system who is providing, or modifying, data extraction templates, of a data management system associated with process 200 for document data extraction template management at RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203.

Herein the terms "individual" and "user" are used interchangeably and include, but are not limited to, any individual party and/or entity as discussed herein, and/or as defined in the art at the time of filing, and/or as defined after the time of filing.

Herein the terms "contributing individual" and "contributing user" are used interchangeably and include, but are not limited to, any individual party and/or entity as discussed herein, and/or as defined in the art at the time of filing, and/or as defined after the time of filing, who provides data extraction template data representing either new data extraction template data or data extraction template data representing a modification to existing data extraction template data, and/or an existing data extraction template.

In one embodiment, at RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 a contributing user provides data extraction template data.

In one embodiment, at RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 a contributing user provides data extraction template data through a user interface provided by the data management system, and/or process 200 for document data extraction template management.

In one embodiment, at RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 through the user interface, a contributing user marks areas and/or fields of the source document and identifies the desired data contained in those areas or fields, and/or modifies and/or adds data fields and/or areas to an existing, or initial, data extraction template.

In one embodiment, at RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 when a contributing user marks areas/fields in a source document, or makes changes to an existing data extraction template, this data is used to generate data extraction template data that contains data indicating the location and contextual information of data in the source document of the specific source document type.

In one embodiment, once a contributing user provides data extraction template data at RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203, process flow proceeds to DETERMINE A FIELD HIT COUNT NUMBER ASSOCIATED WITH THE DATA EXTRACTION TEMPLATE OPERATION 205.

In one embodiment, once data extraction template data is received from one or more contributing users at RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203, the number of data fields within the specific type of source document that the data extraction template is known to extract is determined and recorded, in one embodiment as a field hit count number associated with the data extraction template represented by the data extraction template data, at DETERMINE A FIELD HIT COUNT NUMBER ASSOCIATED WITH THE DATA EXTRACTION TEMPLATE OPERATION 205.

In various embodiments, the field hit count number associated with a data extraction template of DETERMINE A FIELD HIT COUNT NUMBER ASSOCIATED WITH THE DATA EXTRACTION TEMPLATE OPERATION 205 provides an initial indication of how much of the desired data can be obtained from a source document of the associated source document type using the data extraction template. Therefore, the field hit count number associated with a data extraction template of DETERMINE A FIELD HIT COUNT NUMBER ASSOCIATED WITH THE DATA EXTRACTION TEMPLATE OPERATION 205 is a measure of the usefulness of the data extraction template represented by the data extraction template data. In addition, the use of the field hit count number at DETERMINE A FIELD HIT COUNT NUMBER ASSOCIATED WITH THE DATA EXTRACTION TEMPLATE OPERATION 205 takes into consideration the fact that a contributing user providing the data extraction template data may not have contributed all required fields for creation of the data extraction template.

In one embodiment, once created, the data extraction templates represented by the data extraction template data of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 are categorized according to the specific document type associated with the data extraction templates, and for which the data extraction templates are to be used to extract desired data from source documents of the specific source document type. In one embodiment, the data extraction templates associated with a specific source document type, and data representing the field hit count number of DETERMINE A FIELD HIT COUNT NUMBER ASSOCIATED WITH THE DATA EXTRACTION TEMPLATE OPERATION 205, are then aggregated and stored in a data extraction template database according to the category assigned to the data extraction templates, e.g., according to the source document type associated with the data extraction templates.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In one embodiment, once the number of data fields within the specific type of source document that the data extraction template is known to extract is determined and recorded, in one embodiment as a field hit count number associated with the data extraction template represented by the data extraction template data, at DETERMINE A FIELD HIT COUNT NUMBER ASSOCIATED WITH THE DATA EXTRACTION TEMPLATE OPERATION 205, process flow proceeds to RECEIVE SOURCE DOCUMENTS OF THE SPECIFIC SOURCE DOCUMENT TYPE OPERATION 207.

In one embodiment, at RECEIVE SOURCE DOCUMENTS OF THE SPECIFIC SOURCE DOCUMENT TYPE OPERATION 207 a new source document of the specific source document type associated with the data extraction templates of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 is received.

In one embodiment, once a new source document of the specific source document type associated with the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 is received at RECEIVE SOURCE DOCUMENTS OF THE SPECIFIC SOURCE DOCUMENT TYPE OPERATION 207, the data extraction template database is searched to find at least one data extraction template associated with the specific source document type of the new source document and the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 is matched to the new source document.

In one embodiment, once the data extraction template database is searched to find at least one data extraction template associated with the specific source document type of the new source document, and the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 is matched to the new source document, at RECEIVE SOURCE DOCUMENTS OF THE SPECIFIC SOURCE DOCUMENT TYPE OPERATION 207, process flow proceeds to USE THE DATA EXTRACTION TEMPLATE TO EXTRACT DATA FROM THE RECEIVED SOURCE DOCUMENTS OF THE SPECIFIC SOURCE DOCUMENT TYPE OPERATION 209.

In one embodiment, at USE THE DATA EXTRACTION TEMPLATE TO EXTRACT DATA FROM THE RECEIVED SOURCE DOCUMENTS OF THE SPECIFIC SOURCE DOCUMENT TYPE OPERATION 209 the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 matched to the new source document of RECEIVE SOURCE DOCUMENTS OF THE SPECIFIC SOURCE DOCUMENT TYPE OPERATION 207 is applied to the new source document, i.e., desired data is extracted from the new source document using the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203.

In one embodiment, once the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 matched to the new source document of RECEIVE SOURCE DOCUMENTS OF THE SPECIFIC SOURCE DOCUMENT TYPE OPERATION 207 is applied to the new source document, i.e., desired data is extracted from the new source document using the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203, at USE THE DATA EXTRACTION TEMPLATE TO EXTRACT DATA FROM THE RECEIVED SOURCE DOCUMENTS OF THE SPECIFIC SOURCE DOCUMENT TYPE OPERATION 209, process flow proceeds to MONITOR THE ACCEPTANCE OR REJECTION OF DATA EXTRACTED FROM RECEIVED SOURCE DOCUMENTS OF THE SPECIFIC SOURCE DOCUMENT TYPE USING THE DATA EXTRACTION TEMPLATE OPERATION 211.

In one embodiment, when desired data is extracted using the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 at USE THE DATA EXTRACTION TEMPLATE TO EXTRACT DATA FROM THE RECEIVED SOURCE DOCUMENTS OF THE SPECIFIC SOURCE DOCUMENT TYPE OPERATION 209, the extracted desired data is presented to a user of the data extraction template for approval and/or acceptance.

In one embodiment, at MONITOR THE ACCEPTANCE OR REJECTION OF DATA EXTRACTED FROM RECEIVED SOURCE DOCUMENTS OF THE SPECIFIC SOURCE DOCUMENT TYPE USING THE DATA EXTRACTION TEMPLATE OPERATION 211 the instances of acceptance or rejection of desired data extracted from a source document using the new or modified data extraction template is monitored and recorded.

In one embodiment, once the instances of acceptance or rejection of desired data extracted from a source document using the new or modified data extraction template is monitored and recorded at MONITOR THE ACCEPTANCE OR REJECTION OF DATA EXTRACTED FROM RECEIVED SOURCE DOCUMENTS OF THE SPECIFIC SOURCE DOCUMENT TYPE USING THE DATA EXTRACTION TEMPLATE OPERATION 211, process flow proceeds to DETERMINE A DATA ACCEPTANCE COUNT TO BE ASSOCIATED WITH THE DATA EXTRACTION TEMPLATE OPERATION 213.

In one embodiment, at DETERMINE A DATA ACCEPTANCE COUNT TO BE ASSOCIATED WITH THE DATA EXTRACTION TEMPLATE OPERATION 213, based on the acceptance or rejection data resulting from the monitoring of the acceptance or rejection of desired data extracted from source documents using the new or modified data extraction template of MONITOR THE ACCEPTANCE OR REJECTION OF DATA EXTRACTED FROM RECEIVED SOURCE DOCUMENTS OF THE SPECIFIC SOURCE DOCUMENT TYPE USING THE DATA EXTRACTION TEMPLATE OPERATION 211, a data acceptance count to be associated with the data extraction template is determined.

In one embodiment, when a data extraction template is created, i.e., when new data extraction template data is received, the data acceptance count associated with the new data extraction template is recorded as one, or some other defined initial value, at DETERMINE A DATA ACCEPTANCE COUNT TO BE ASSOCIATED WITH THE DATA EXTRACTION TEMPLATE OPERATION 213.

In one embodiment, each time the entirety of the desired data extracted from a source document of the specific source document type using the new or modified data extraction template, or any data extraction template, is accepted by a user of the data extraction template, the data acceptance count associated with that data extraction template is increased at DETERMINE A DATA ACCEPTANCE COUNT TO BE ASSOCIATED WITH THE DATA EXTRACTION TEMPLATE OPERATION 213; in one embodiment by one point for each instance where the extracted desired data is accepted.

In one embodiment, if a user of an existing data extraction template contributes new data extraction template data indicating a new field, or other modification, to the existing data extraction template, new data extraction template data is generated representing a new data extraction template including the original data extraction template data and the user modifications to the original data extraction template. In one embodiment, the modified or new data extraction template is then assigned a new field hit count number reflecting any added data fields that can be extracted using the new data extraction template and the user acceptance count associated with the new data extraction template is set to one, or another initial use value, at DETERMINE A DATA ACCEPTANCE COUNT TO BE ASSOCIATED WITH THE DATA EXTRACTION TEMPLATE OPERATION 213.

In one embodiment, once a data acceptance count to be associated with the data extraction template is determined at DETERMINE A DATA ACCEPTANCE COUNT TO BE ASSOCIATED WITH THE DATA EXTRACTION TEMPLATE OPERATION 213, process flow proceeds to TRANSFORM THE FIELD HIT COUNT NUMBER AND THE DATA ACCEPTANCE COUNT ASSOCIATED WITH THE DATA EXTRACTION TEMPLATE INTO DATA EXTRACTION TEMPLATE RANKING SCORE DATA FOR THE DATA EXTRACTION TEMPLATE OPERATION 215.

In one embodiment, at TRANSFORM THE FIELD HIT COUNT NUMBER AND THE DATA ACCEPTANCE COUNT ASSOCIATED WITH THE DATA EXTRACTION TEMPLATE INTO DATA EXTRACTION TEMPLATE RANKING SCORE DATA FOR THE DATA EXTRACTION TEMPLATE OPERATION 215 data representing the field hit count number of DETERMINE A FIELD HIT COUNT NUMBER ASSOCIATED WITH THE DATA EXTRACTION TEMPLATE OPERATION 205 associated with the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203, and data representing the data acceptance count of DETERMINE A DATA ACCEPTANCE COUNT TO BE ASSOCIATED WITH THE DATA EXTRACTION TEMPLATE OPERATION 213 associated with the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203, are processed and combined to transform the field hit count number and acceptance count data associated with the data extraction template into ranking score data to be associated with the data extraction template.

In one embodiment, at TRANSFORM THE FIELD HIT COUNT NUMBER AND THE DATA ACCEPTANCE COUNT ASSOCIATED WITH THE DATA EXTRACTION TEMPLATE INTO DATA EXTRACTION TEMPLATE RANKING SCORE DATA FOR THE DATA EXTRACTION TEMPLATE OPERATION 215 data representing the field hit count number and data representing the data acceptance count associated with the data extraction template are added to transform the field hit count number and acceptance count data associated with the data extraction template into ranking score data to be associated with the data extraction template.

In one embodiment, at TRANSFORM THE FIELD HIT COUNT NUMBER AND THE DATA ACCEPTANCE COUNT ASSOCIATED WITH THE DATA EXTRACTION TEMPLATE INTO DATA EXTRACTION TEMPLATE RANKING SCORE DATA FOR THE DATA EXTRACTION TEMPLATE OPERATION 215 data representing the field hit count number and data representing the data acceptance count associated with the data extraction template are weighted and combined to transform the field hit count number and acceptance count data associated with the data extraction template into ranking score data to be associated with the data extraction template.

In one embodiment, at TRANSFORM THE FIELD HIT COUNT NUMBER AND THE DATA ACCEPTANCE COUNT ASSOCIATED WITH THE DATA EXTRACTION TEMPLATE INTO DATA EXTRACTION TEMPLATE RANKING SCORE DATA FOR THE DATA EXTRACTION TEMPLATE OPERATION 215 data representing the field hit count number and data representing the data acceptance count associated with the data extraction template are processed to transform the field hit count number and acceptance count data associated with the data extraction template into ranking score data to be associated with the data extraction template using any processing procedure and rules desired, as discussed herein, and/or known/desired at the time of filing, and/or as known/desired after the time of filing.

Given that the field hit count number associated with a given data extraction template is representative of the ability of the given data extraction template to extract the desired data from associated source document type, and that the acceptance count data associated with a given data extraction template is representative of the quality of data extraction performed by the given data extraction template, the ranking score data associated with a given data extraction template of TRANSFORM THE FIELD HIT COUNT NUMBER AND THE DATA ACCEPTANCE COUNT ASSOCIATED WITH THE DATA EXTRACTION TEMPLATE INTO DATA EXTRACTION TEMPLATE RANKING SCORE DATA FOR THE DATA EXTRACTION TEMPLATE OPERATION 215 is a dynamic indication of how effective and accurate the given data extraction template is for extracting desired data from a specific type of source document.

In one embodiment, once data representing the field hit count number of DETERMINE A FIELD HIT COUNT NUMBER ASSOCIATED WITH THE DATA EXTRACTION TEMPLATE OPERATION 205 associated with the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203, and data representing the data acceptance count of DETERMINE A DATA ACCEPTANCE COUNT TO BE ASSOCIATED WITH THE DATA EXTRACTION TEMPLATE OPERATION 213 associated with the data extraction template of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 are processed and combined to transform the field hit count number and acceptance count data associated with the data extraction template into ranking score data to be associated with the data extraction template at TRANSFORM THE FIELD HIT COUNT NUMBER AND THE DATA ACCEPTANCE COUNT ASSOCIATED WITH THE DATA EXTRACTION TEMPLATE INTO DATA EXTRACTION TEMPLATE RANKING SCORE DATA FOR THE DATA EXTRACTION TEMPLATE OPERATION 215, process flow proceeds to SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 217.

In one embodiment, at SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 217 the data extraction template data of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 and the data extraction template ranking score data for the data extraction template of TRANSFORM THE FIELD HIT COUNT NUMBER AND THE DATA ACCEPTANCE COUNT ASSOCIATED WITH THE DATA EXTRACTION TEMPLATE INTO DATA EXTRACTION TEMPLATE RANKING SCORE DATA FOR THE DATA EXTRACTION TEMPLATE OPERATION 215 are correlated and stored as ranked data extraction template data.

In one embodiment, once the data extraction template data of RECEIVE DATA EXTRACTION TEMPLATE DATA REPRESENTING A DATA EXTRACTION TEMPLATE ASSOCIATED WITH A SPECIFIC SOURCE DOCUMENT TYPE OPERATION 203 and the data extraction template ranking score data for the data extraction template of TRANSFORM THE FIELD HIT COUNT NUMBER AND THE DATA ACCEPTANCE COUNT ASSOCIATED WITH THE DATA EXTRACTION TEMPLATE INTO DATA EXTRACTION TEMPLATE RANKING SCORE DATA FOR THE DATA EXTRACTION TEMPLATE OPERATION 215 are correlated and stored as ranked data extraction template data at SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 217, process flow proceeds to AGGREGATE RANKED DATA EXTRACTION TEMPLATE DATA ASSOCIATED WITH TWO OR MORE DATA EXTRACTION TEMPLATES ASSOCIATED WITH THE SPECIFIC SOURCE DOCUMENT TYPE OPERATION 219.

In one embodiment, at AGGREGATE RANKED DATA EXTRACTION TEMPLATE DATA ASSOCIATED WITH TWO OR MORE DATA EXTRACTION TEMPLATES ASSOCIATED WITH THE SPECIFIC SOURCE DOCUMENT TYPE OPERATION 219 ranked data extraction template data of SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 217 associated with two or more data extraction templates associated with the specific source document type are aggregated and stored.

In one embodiment, at AGGREGATE RANKED DATA EXTRACTION TEMPLATE DATA ASSOCIATED WITH TWO OR MORE DATA EXTRACTION TEMPLATES ASSOCIATED WITH THE SPECIFIC SOURCE DOCUMENT TYPE OPERATION 219 ranked data extraction template data of SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 217 associated with two or more data extraction templates associated with the specific source document type are categorized according to the specific document type associated with the data extraction templates, and for which the data extraction templates are to be used to extract desired data from source documents of the specific source document type.

In one embodiment, at AGGREGATE RANKED DATA EXTRACTION TEMPLATE DATA ASSOCIATED WITH TWO OR MORE DATA EXTRACTION TEMPLATES ASSOCIATED WITH THE SPECIFIC SOURCE DOCUMENT TYPE OPERATION 219 the ranked data extraction template data of SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 217 associated with two or more data extraction templates associated with the specific source document type are then aggregated and stored in a data extraction template database according to the category assigned to the data extraction templates, e.g., according to the source document type associated with the data extraction templates.

In one embodiment, at AGGREGATE RANKED DATA EXTRACTION TEMPLATE DATA ASSOCIATED WITH TWO OR MORE DATA EXTRACTION TEMPLATES ASSOCIATED WITH THE SPECIFIC SOURCE DOCUMENT TYPE OPERATION 219 when data extraction template data representing two or more data extraction templates associated with a given specific source document type is received, the ranking score data associated with data extraction templates is used to determine which of the data extraction templates is applied/used with new source documents of the specific document type, at least initially, at USE THE DATA EXTRACTION TEMPLATE TO EXTRACT DATA FROM THE RECEIVED SOURCE DOCUMENTS OF THE SPECIFIC SOURCE DOCUMENT TYPE OPERATION 209.

In one embodiment, when a new source document of a specific source document type is received at RECEIVE SOURCE DOCUMENTS OF THE SPECIFIC SOURCE DOCUMENT TYPE OPERATION 207, the data extraction template database is searched to identify the one or more data extraction templates categorized as being associated with the specific source document type of the new source document.

In one embodiment, the extracted desired data is then presented to the data extraction template user for acceptance or rejection. In various embodiments, and in cases where multiple values for a particular field are detected, i.e., duplicate or redundant desired data is obtained, all such desired data are presented to the data extraction template user in a combo box or table. Then the data extraction template user is asked to select the correct desired data and when the data extraction template user selects the correct desired data, the data acceptance count for the data extraction template is increased at DETERMINE A DATA ACCEPTANCE COUNT TO BE ASSOCIATED WITH THE DATA EXTRACTION TEMPLATE OPERATION 213, thereby also increasing the ranking score associated with the data extraction template at TRANSFORM THE FIELD HIT COUNT NUMBER AND THE DATA ACCEPTANCE COUNT ASSOCIATED WITH THE DATA EXTRACTION TEMPLATE INTO DATA EXTRACTION TEMPLATE RANKING SCORE DATA FOR THE DATA EXTRACTION TEMPLATE OPERATION 215.

Given that the data ranking score associated with a given data extraction template is increased each time the data acceptance count for the data extraction template is increased, and that the data field count number associated with a given data extraction template can also be increased by the modification mechanisms discussed above, the result of the application of process 200 for document data extraction template management is a dynamic ranking system of all the data extraction templates associated with a given source document type.

In one embodiment, as the ranking score associated with multiple data extraction templates associated with a specific source document type changes, the data extraction templates with the lowest data ranking scores are determined to be no longer relevant. In one embodiment, these data extraction templates with the lowest data ranking scores are then discarded.

As one specific example, in one embodiment, a threshold number of data extraction templates associated with a specific source document type is defined and once the number of data extraction templates associated with the specific source document type in the data extraction template database reaches this threshold number, data extraction templates having the lowest ranking score are deleted from the data extraction template database as new data extraction template data is received.

In this way, the number of data extraction templates, and the amount of data extraction template data, that is stored is automatically managed so that memory and data processing is not expended on irrelevant, or outdated, data extraction template data.

In one embodiment, once ranked data extraction template data of SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 217 associated with two or more data extraction templates associated with the specific source document type are aggregated and stored at AGGREGATE RANKED DATA EXTRACTION TEMPLATE DATA ASSOCIATED WITH TWO OR MORE DATA EXTRACTION TEMPLATES ASSOCIATED WITH THE SPECIFIC SOURCE DOCUMENT TYPE OPERATION 219, process flow proceeds to EXIT OPERATION 230.

In one embodiment, at EXIT OPERATION 230, process 200 for document data extraction template management is exited to await new data.

As noted above, in one embodiment, when a new source document is received, the new source document is matched recursively against the data extraction templates associated with the new source document type having the highest ranking scores until the number of data fields that can be extracted for the new source document match the field hit count for the data extraction template.

Figure 3:
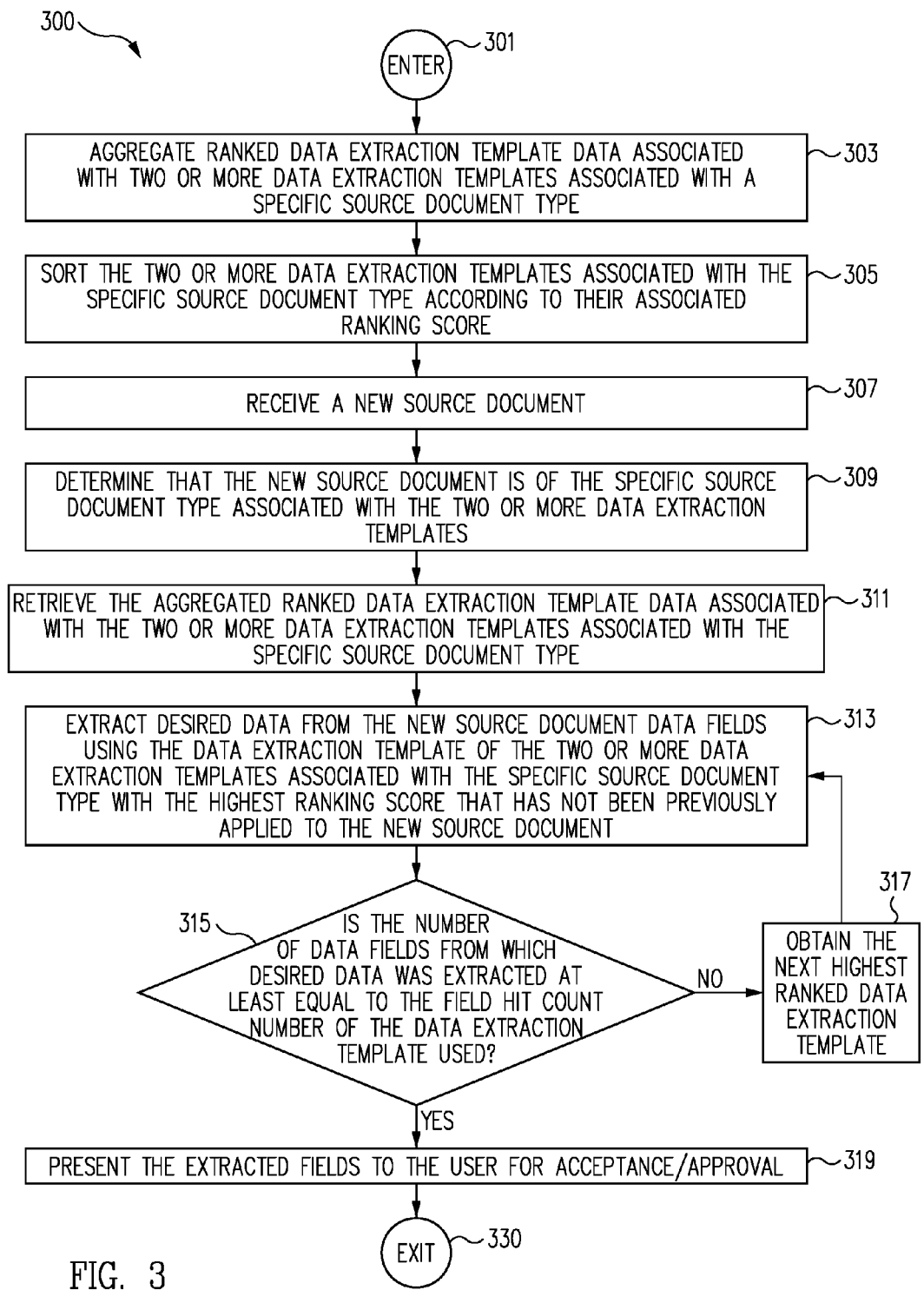
FIG. 3 is a flow chart depicting a recursive application of data extraction templates associated with a specific source document type as applied to a new source document of the specific source document type in accordance with one embodiment.

FIG. 3 is a flow chart of a process 300 for recursive application of data extraction templates associated with a specific source document type as applied to a new source document of the specific source document type in accordance with one embodiment.

In one embodiment, process 300 begins at ENTER operation 301 and process flow proceeds to AGGREGATE RANKED DATA EXTRACTION TEMPLATE DATA ASSOCIATED WITH TWO OR MORE DATA EXTRACTION TEMPLATES ASSOCIATED WITH A SPECIFIC SOURCE DOCUMENT TYPE OPERATION 303. In various embodiments, AGGREGATE RANKED DATA EXTRACTION TEMPLATE DATA ASSOCIATED WITH TWO OR MORE DATA EXTRACTION TEMPLATES ASSOCIATED WITH A SPECIFIC SOURCE DOCUMENT TYPE OPERATION 303 is essentially similar to AGGREGATE RANKED DATA EXTRACTION TEMPLATE DATA ASSOCIATED WITH TWO OR MORE DATA EXTRACTION TEMPLATES ASSOCIATED WITH THE SPECIFIC SOURCE DOCUMENT TYPE OPERATION 219 in that ranked data extraction template data of SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 217 associated with two or more data extraction templates associated with the specific source document type are aggregated and stored at AGGREGATE RANKED DATA EXTRACTION TEMPLATE DATA ASSOCIATED WITH TWO OR MORE DATA EXTRACTION TEMPLATES ASSOCIATED WITH A SPECIFIC SOURCE DOCUMENT TYPE OPERATION 303.

In one embodiment, once ranked data extraction template data of SAVE THE DATA EXTRACTION TEMPLATE DATA AND THE DATA EXTRACTION TEMPLATE RANKING SCORE DATA FOR THE DATA EXTRACTION TEMPLATE AS RANKED DATA EXTRACTION TEMPLATE DATA OPERATION 217 associated with two or more data extraction templates associated with the specific source document type are aggregated and stored at AGGREGATE RANKED DATA EXTRACTION TEMPLATE DATA ASSOCIATED WITH TWO OR MORE DATA EXTRACTION TEMPLATES ASSOCIATED WITH A SPECIFIC SOURCE DOCUMENT TYPE OPERATION 303, process flow proceeds to SORT THE TWO OR MORE DATA EXTRACTION TEMPLATES ASSOCIATED WITH THE SPECIFIC SOURCE DOCUMENT TYPE ACCORDING TO THEIR ASSOCIATED RANKING SCORE OPERATION 305.

In one embodiment, at SORT THE TWO OR MORE DATA EXTRACTION TEMPLATES ASSOCIATED WITH THE SPECIFIC SOURCE DOCUMENT TYPE ACCORDING TO THEIR ASSOCIATED RANKING SCORE OPERATION 305 the two or more data extraction templates associated with the specific source document type of AGGREGATE RANKED DATA EXTRACTION TEMPLATE DATA ASSOCIATED WITH TWO OR MORE DATA EXTRACTION TEMPLATES ASSOCIATED WITH A SPECIFIC SOURCE DOCUMENT TYPE OPERATION 303 are sorted, or stored, according to the ranking score indicated by the ranking score data included in the ranked data extraction template data associated with each of the two or more data extraction templates.

In one embodiment, at SORT THE TWO OR MORE DATA EXTRACTION TEMPLATES ASSOCIATED WITH THE SPECIFIC SOURCE DOCUMENT TYPE ACCORDING TO THEIR ASSOCIATED RANKING SCORE OPERATION 305 the two or more data extraction templates associated with the specific source document type are sorted from highest ranking score to lowest ranking score. In one embodiment, at SORT THE TWO OR MORE DATA EXTRACTION TEMPLATES ASSOCIATED WITH THE SPECIFIC SOURCE DOCUMENT TYPE ACCORDING TO THEIR ASSOCIATED RANKING SCORE OPERATION 305 the two or more data extraction templates associated with the specific source document type are sorted from lowest ranking score to highest ranking score.

In one embodiment, once the two or more data extraction templates associated with the specific source document type are sorted, or stored, according to the ranking score at SORT THE TWO OR MORE DATA EXTRACTION TEMPLATES ASSOCIATED WITH THE SPECIFIC SOURCE DOCUMENT TYPE ACCORDING TO THEIR ASSOCIATED RANKING SCORE OPERATION 305, process flow proceeds to RECEIVE A NEW SOURCE DOCUMENT OPERATION 307.

In one embodiment, at RECEIVE A NEW SOURCE DOCUMENT OPERATION 307 a new source document is received from which desired data is to be extracted. In one embodiment, once a new source document is received at RECEIVE A NEW SOURCE DOCUMENT OPERATION 307, process flow proceeds to DETERMINE THAT THE NEW SOURCE DOCUMENT IS OF THE SPECIFIC SOURCE DOCUMENT TYPE ASSOCIATED WITH THE TWO OR MORE DATA EXTRACTION TEMPLATES OPERATION 309.

In one embodiment, at DETERMINE THAT THE NEW SOURCE DOCUMENT IS OF THE SPECIFIC SOURCE DOCUMENT TYPE ASSOCIATED WITH THE TWO OR MORE DATA EXTRACTION TEMPLATES OPERATION 309 the new source document of RECEIVE A NEW SOURCE DOCUMENT OPERATION 307 is identified as being a source document of the specific source document type associated with the two or more data extraction templates associated with the specific source document type of AGGREGATE RANKED DATA EXTRACTION TEMPLATE DATA ASSOCIATED WITH TWO OR MORE DATA EXTRACTION TEMPLATES ASSOCIATED WITH A SPECIFIC SOURCE DOCUMENT TYPE OPERATION 303.

In one embodiment, once the new source document of RECEIVE A NEW SOURCE DOCUMENT OPERATION is identified as being a source document of the specific source document type associated with the two or more data extraction templates associated with the specific source document type of AGGREGATE RANKED DATA EXTRACTION TEMPLATE DATA ASSOCIATED WITH TWO OR MORE DATA EXTRACTION TEMPLATES ASSOCIATED WITH A SPECIFIC SOURCE DOCUMENT TYPE OPERATION 303 at DETERMINE THAT THE NEW SOURCE DOCUMENT IS OF THE SPECIFIC SOURCE DOCUMENT TYPE ASSOCIATED WITH THE TWO OR MORE DATA EXTRACTION TEMPLATES OPERATION 309, process flow proceeds to RETRIEVE THE AGGREGATED RANKED DATA EXTRACTION TEMPLATE DATA ASSOCIATED WITH THE TWO OR MORE DATA EXTRACTION TEMPLATES ASSOCIATED WITH THE SPECIFIC SOURCE DOCUMENT TYPE OPERATION 311.

In one embodiment, at RETRIEVE THE AGGREGATED RANKED DATA EXTRACTION TEMPLATE DATA ASSOCIATED WITH THE TWO OR MORE DATA EXTRACTION TEMPLATES ASSOCIATED WITH THE SPECIFIC SOURCE DOCUMENT TYPE OPERATION 311 data representing the two or more data extraction templates associated with the specific source document type of AGGREGATE RANKED DATA EXTRACTION TEMPLATE DATA ASSOCIATED WITH TWO OR MORE DATA EXTRACTION TEMPLATES ASSOCIATED WITH A SPECIFIC SOURCE DOCUMENT TYPE OPERATION 303, sorted according to ranking score at SORT THE TWO OR MORE DATA EXTRACTION TEMPLATES ASSOCIATED WITH THE SPECIFIC SOURCE DOCUMENT TYPE ACCORDING TO THEIR ASSOCIATED RANKING SCORE OPERATION 305, is obtained.

In one embodiment, at RETRIEVE THE AGGREGATED RANKED DATA EXTRACTION TEMPLATE DATA ASSOCIATED WITH THE TWO OR MORE DATA EXTRACTION TEMPLATES ASSOCIATED WITH THE SPECIFIC SOURCE DOCUMENT TYPE OPERATION 311 data representing the two or more data extraction templates associated with the specific source document type of AGGREGATE RANKED DATA EXTRACTION TEMPLATE DATA ASSOCIATED WITH TWO OR MORE DATA EXTRACTION TEMPLATES ASSOCIATED WITH A SPECIFIC SOURCE DOCUMENT TYPE OPERATION 303, sorted according to ranking score at SORT THE TWO OR MORE DATA EXTRACTION TEMPLATES ASSOCIATED WITH THE SPECIFIC SOURCE DOCUMENT TYPE ACCORDING TO THEIR ASSOCIATED RANKING SCORE OPERATION 305, is retrieved form a data extraction template database.

In one embodiment, once data representing the two or more data extraction templates associated with the specific source document type of AGGREGATE RANKED DATA EXTRACTION TEMPLATE DATA ASSOCIATED WITH TWO OR MORE DATA EXTRACTION TEMPLATES ASSOCIATED WITH A SPECIFIC SOURCE DOCUMENT TYPE OPERATION 303, sorted according to ranking score at SORT THE TWO OR MORE DATA EXTRACTION TEMPLATES ASSOCIATED WITH THE SPECIFIC SOURCE DOCUMENT TYPE ACCORDING TO THEIR ASSOCIATED RANKING SCORE OPERATION 305, is obtained at RETRIEVE THE AGGREGATED RANKED DATA EXTRACTION TEMPLATE DATA ASSOCIATED WITH THE TWO OR MORE DATA EXTRACTION TEMPLATES ASSOCIATED WITH THE SPECIFIC SOURCE DOCUMENT TYPE OPERATION 311, process flow proceeds to EXTRACT DESIRED DATA FROM THE NEW SOURCE DOCUMENT DATA FIELDS USING THE DATA EXTRACTION TEMPLATE OF THE TWO OR MORE DATA EXTRACTION TEMPLATES ASSOCIATED WITH THE SPECIFIC SOURCE DOCUMENT TYPE WITH THE HIGHEST RANKING SCORE THAT HAS NOT BEEN PREVIOUSLY APPLIED TO THE NEW SOURCE DOCUMENT OPERATION 313.

In one embodiment, at EXTRACT DESIRED DATA FROM THE NEW SOURCE DOCUMENT DATA FIELDS USING THE DATA EXTRACTION TEMPLATE OF THE TWO OR MORE DATA EXTRACTION TEMPLATES ASSOCIATED WITH THE SPECIFIC SOURCE DOCUMENT TYPE WITH THE HIGHEST RANKING SCORE THAT HAS NOT BEEN PREVIOUSLY APPLIED TO THE NEW SOURCE DOCUMENT OPERATION 313, the data extraction template of the two or more data extraction templates of RETRIEVE THE AGGREGATED RANKED DATA EXTRACTION TEMPLATE DATA ASSOCIATED WITH THE TWO OR MORE DATA EXTRACTION TEMPLATES ASSOCIATED WITH THE SPECIFIC SOURCE DOCUMENT TYPE OPERATION 311 having the highest ranking score, and that has not previously been applied to the new source document of RECEIVE A NEW SOURCE DOCUMENT OPERATION 307, is used to extract desired data from data fields identified in the new source document by the data extraction template.

In one embodiment, initially, the data extraction template of the two or more data extraction templates of RETRIEVE THE AGGREGATED RANKED DATA EXTRACTION TEMPLATE DATA ASSOCIATED WITH THE TWO OR MORE DATA EXTRACTION TEMPLATES ASSOCIATED WITH THE SPECIFIC SOURCE DOCUMENT TYPE OPERATION 311 having the highest ranking score is used to extract desired data from data fields identified in the new source document by the data extraction template. However, as discussed below, if the number of data fields from which desired data is extracted using the data extraction template having the highest ranking score does not at least equal the field hit count number of the data extraction template, then the data extraction template of the two or more data extraction templates having the next highest ranking score is used.

In one embodiment, this process is repeated, recursively, until the number of data fields from which desired data is extracted using the data extraction template at least equals the field hit count number of the data extraction template.

To this end, in one embodiment, once, the data extraction template of the two or more data extraction templates having the highest ranking score, and that has not previously been applied to the new source document, is used to extract desired data from data fields identified in the new source document by the data extraction template at EXTRACT DESIRED DATA FROM THE NEW SOURCE DOCUMENT DATA FIELDS USING THE DATA EXTRACTION TEMPLATE OF THE TWO OR MORE DATA EXTRACTION TEMPLATES ASSOCIATED WITH THE SPECIFIC SOURCE DOCUMENT TYPE WITH THE HIGHEST RANKING SCORE THAT HAS NOT BEEN PREVIOUSLY APPLIED TO THE NEW SOURCE DOCUMENT OPERATION 313, process flow proceeds to IS THE NUMBER OF DATA FIELDS FROM WHICH DESIRED DATA WAS EXTRACTED AT LEAST EQUAL TO THE FIELD HIT COUNT NUMBER OF THE DATA EXTRACTION TEMPLATE USED? OPERATION 315.

In one embodiment, if at IS THE NUMBER OF DATA FIELDS FROM WHICH DESIRED DATA WAS EXTRACTED AT LEAST EQUAL TO THE FIELD HIT COUNT NUMBER OF THE DATA EXTRACTION TEMPLATE USED? OPERATION 315, a determination is made that the number of data fields from which desired data is extracted using the data extraction template of EXTRACT DESIRED DATA FROM THE NEW SOURCE DOCUMENT DATA FIELDS USING THE DATA EXTRACTION TEMPLATE OF THE TWO OR MORE DATA EXTRACTION TEMPLATES ASSOCIATED WITH THE SPECIFIC SOURCE DOCUMENT TYPE WITH THE HIGHEST RANKING SCORE THAT HAS NOT BEEN PREVIOUSLY APPLIED TO THE NEW SOURCE DOCUMENT OPERATION 313 does not at least equal the field hit count number of the data extraction template, i.e., a "NO" determination is made at IS THE NUMBER OF DATA FIELDS FROM WHICH DESIRED DATA WAS EXTRACTED AT LEAST EQUAL TO THE FIELD HIT COUNT NUMBER OF THE DATA EXTRACTION TEMPLATE USED? OPERATION 315, process flow proceeds to OBTAIN THE NEXT HIGHEST RANKED DATA EXTRACTION TEMPLATE OPERATION 317.

In one embodiment, at OBTAIN THE NEXT HIGHEST RANKED DATA EXTRACTION TEMPLATE OPERATION 317, the data extraction template of the two or more data extraction templates of RETRIEVE THE AGGREGATED RANKED DATA EXTRACTION TEMPLATE DATA ASSOCIATED WITH THE TWO OR MORE DATA EXTRACTION TEMPLATES ASSOCIATED WITH THE SPECIFIC SOURCE DOCUMENT TYPE OPERATION 311 having the next highest ranking score is obtained and used at EXTRACT DESIRED DATA FROM THE NEW SOURCE DOCUMENT DATA FIELDS USING THE DATA EXTRACTION TEMPLATE OF THE TWO OR MORE DATA EXTRACTION TEMPLATES ASSOCIATED WITH THE SPECIFIC SOURCE DOCUMENT TYPE WITH THE HIGHEST RANKING SCORE THAT HAS NOT BEEN PREVIOUSLY APPLIED TO THE NEW SOURCE DOCUMENT OPERATION 313.

As noted above, this sub-process of EXTRACT DESIRED DATA FROM THE NEW SOURCE DOCUMENT DATA FIELDS USING THE DATA EXTRACTION TEMPLATE OF THE TWO OR MORE DATA EXTRACTION TEMPLATES ASSOCIATED WITH THE SPECIFIC SOURCE DOCUMENT TYPE WITH THE HIGHEST RANKING SCORE THAT HAS NOT BEEN PREVIOUSLY APPLIED TO THE NEW SOURCE DOCUMENT OPERATION 313, IS THE NUMBER OF DATA FIELDS FROM WHICH DESIRED DATA WAS EXTRACTED AT LEAST EQUAL TO THE FIELD HIT COUNT NUMBER OF THE DATA EXTRACTION TEMPLATE USED? OPERATION 315, and OBTAIN THE NEXT HIGHEST RANKED DATA EXTRACTION TEMPLATE OPERATION 317, is repeated until either all of the two or more data extraction templates of RETRIEVE THE AGGREGATED RANKED DATA EXTRACTION TEMPLATE DATA ASSOCIATED WITH THE TWO OR MORE DATA EXTRACTION TEMPLATES ASSOCIATED WITH THE SPECIFIC SOURCE DOCUMENT TYPE OPERATION 311 have been tried, or a determination is made that the number of data fields from which desired data is extracted using the data extraction template of EXTRACT DESIRED DATA FROM THE NEW SOURCE DOCUMENT DATA FIELDS USING THE DATA EXTRACTION TEMPLATE OF THE TWO OR MORE DATA EXTRACTION TEMPLATES ASSOCIATED WITH THE SPECIFIC SOURCE DOCUMENT TYPE WITH THE HIGHEST RANKING SCORE THAT HAS NOT BEEN PREVIOUSLY APPLIED TO THE NEW SOURCE DOCUMENT OPERATION 313 does at least equal the field hit count number of the data extraction template, i.e., a "YES" determination is made at IS THE NUMBER OF DATA FIELDS FROM WHICH DESIRED DATA WAS EXTRACTED AT LEAST EQUAL TO THE FIELD HIT COUNT NUMBER OF THE DATA EXTRACTION TEMPLATE USED? OPERATION 315.

In one embodiment, once a "YES" determination is made at IS THE NUMBER OF DATA FIELDS FROM WHICH DESIRED DATA WAS EXTRACTED AT LEAST EQUAL TO THE FIELD HIT COUNT NUMBER OF THE DATA EXTRACTION TEMPLATE USED? OPERATION 315, process flow proceeds to PRESENT THE EXTRACTED FIELDS TO THE USER FOR ACCEPTANCE/APPROVAL OPERATION 319.

In one embodiment, at PRESENT THE EXTRACTED FIELDS TO THE USER FOR ACCEPTANCE/APPROVAL OPERATION 319 the extracted desired data is presented to a user of the data extraction template for approval and/or acceptance. In one embodiment, once the extracted desired data is presented to a user of the data extraction template for approval and/or acceptance at PRESENT THE EXTRACTED FIELDS TO THE USER FOR ACCEPTANCE/APPROVAL OPERATION 319, process flow proceeds to EXIT OPERATION 330.

In one embodiment, form EXIT OPERATION 330 of FIG. 3, process flow proceeds back to MONITOR THE ACCEPTANCE OR REJECTION OF DATA EXTRACTED FROM RECEIVED SOURCE DOCUMENTS OF THE SPECIFIC SOURCE DOCUMENT TYPE USING THE DATA EXTRACTION TEMPLATE OPERATION 211 and DETERMINE A DATA ACCEPTANCE COUNT TO BE ASSOCIATED WITH THE DATA EXTRACTION TEMPLATE OPERATION 213 process 200 for document data extraction template management discussed above.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 200 for document data extraction template management discussed above, user-contribution is leveraged to not only create data extraction templates, but user contribution is also used to rank and manage all data extraction templates associated with a specific source document type. As a result, using process 200 for document data extraction template management discussed above, the efficiency of the data extraction template creation, application, and management is dynamic and constantly improving as more data management system users join the system and more and more data extraction template data is received.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for document data extraction template management comprising the following, which when executed individually or collectively by any set of one or more processors perform a process including:
    receiving data extraction template data representing a data extraction template associated with a specific source document type;
    determining a field hit count number associated with the data extraction template, the field hit count number indicating the number of data fields from which data can be extracted from the specific source document type using the data extraction template;
    using the data extraction template to extract data from received source documents of the specific source document type;
    monitoring the acceptance or rejection of data extracted from received source documents of the specific source document type using the data extraction template;
    determining a data acceptance count to be associated with the data extraction template, the data acceptance count indicating the number of times the data extracted from received source documents of the specific source document type using the data extraction template is accepted;
    transforming the field hit count number associated with the data extraction template and the data acceptance count associated with the data extraction template into data extraction template ranking score data for the data extraction template;
    saving the data extraction template data and the data extraction template ranking score data for the data extraction template as ranked data extraction template data; and
    aggregating ranked data extraction template data associated with two or more data extraction templates associated with the specific source document type.

2. The computing system implemented method for document data extraction template management of claim 1 wherein the data extraction template data representing a data extraction template associated with a specific source document type is received from users of a data management system associated with the efficient and scalable data extraction template management system.

3. The computing system implemented method for document data extraction template management of claim 2 wherein the data management system is a financial management system.

4. The computing system implemented method for document data extraction template management of claim 1 further comprising:
    when a source document of the specific source document type is received, the two or more data extraction templates associated with the specific source document type are used in the order of highest data extraction template ranking scores to extract data from the source document until all of the desired data is extracted from the source document.

5. The computing system implemented method for document data extraction template management of claim 4 further comprising:
    increasing the data acceptance count associated with a data extraction template used to extract accepted data from the source document.

6. The computing system implemented method for document data extraction template management of claim 5 further comprising:
    transforming the data extraction template ranking score associated with the data extraction template used to extract accepted data from the source document to reflect the increase in the data acceptance count associated with the data extraction template used to extract accepted data.

7. The computing system implemented method for document data extraction template management of claim 1 further comprising:
    determining a threshold number of data extraction templates associated with a specific document type; and
    once the threshold number of data extraction templates associated with the specific document type is attained, eliminating a data extraction template associated with the specific document type having a lowest data extraction template ranking score before a new data extraction template associated with the specific document type is added.

8. The computing system implemented method for document data extraction template management of claim 1 further comprising:
    determining a threshold data extraction template ranking score; and
    eliminating data extraction templates associated with the specific document type having a data extraction template ranking score below the threshold data extraction template ranking score.

9. A computer program product for document data extraction template management comprising:
    a non-transitory computer readable medium;
    and computer program code, encoded on the non-transitory computer readable medium, comprising computer readable instructions which, when executed via any set of one or more processors, perform the following:
    receiving data extraction template data representing a data extraction template associated with a specific source document type;
    determining a field hit count number associated with the data extraction template, the field hit count number indicating the number of data fields from which data can be extracted from the specific source document type using the data extraction template;

using the data extraction template to extract data from received source documents of the specific source document type;

monitoring the acceptance or rejection of data extracted from received source documents of the specific source document type using the data extraction template;

determining a data acceptance count to be associated with the data extraction template, the data acceptance count indicating the number of times the data extracted from received source documents of the specific source document type using the data extraction template is accepted;

transforming the field hit count number associated with the data extraction template and the data acceptance count associated with the data extraction template into data extraction template ranking score data for the data extraction template;

saving the data extraction template data and the data extraction template ranking score data for the data extraction template as ranked data extraction template data; and aggregating ranked data extraction template data associated with two or more data extraction templates associated with the specific source document type.

10. The computer program product for document data extraction template management of claim 9 wherein the data extraction template data representing a data extraction template associated with a specific source document type is received from users of a data management system associated with the efficient and scalable data extraction template management system.

11. The computer program product for document data extraction template management of claim 10 wherein the data management system is a financial management system.

12. The computer program product for document data extraction template management of claim 9 further comprising computer program code, encoded on the non-transitory computer readable medium, comprising computer readable instructions which, when executed via any set of one or more processors, perform the following:

when a source document of the specific source document type is received, the two or more data extraction templates associated with the specific source document type are used in the order of highest data extraction template ranking scores to extract data from the source document until all of the desired data is extracted from the source document.

13. The computer program product for document data extraction template management of claim 12 further comprising computer program code, encoded on the non-transitory computer readable medium, comprising computer readable instructions which, when executed via any set of one or more processors, perform the following:

increasing the data acceptance count associated with a data extraction template used to extract accepted data from the source document.

14. The computer program product for document data extraction template management of claim 13 further comprising computer program code, encoded on the non-transitory computer readable medium, comprising computer readable instructions which, when executed via any set of one or more processors, perform the following:

transforming the data extraction template ranking score associated with the data extraction template used to extract accepted data from the source document to reflect the increase in the data acceptance count associated with the data extraction template used to extract accepted data.

15. The computer program product for document data extraction template management of claim 9 further comprising computer program code, encoded on the non-transitory computer readable medium, comprising computer readable instructions which, when executed via any set of one or more processors, perform the following:

determining a threshold number of data extraction templates associated with a specific document type; and once the threshold number of data extraction templates associated with the specific document type is attained, eliminating a data extraction template associated with the specific document type having a lowest data extraction template ranking score before a new data extraction template associated with the specific document type is added.

16. The computer program product for document data extraction template management of claim 9 further comprising:

determining a threshold data extraction template ranking score; and eliminating data extraction templates associated with the specific document type having a data extraction template ranking score below the threshold data extraction template ranking score.

17. A system for document data extraction template management comprising:

at least one processor; and at least one memory coupled to the at least one processor, the at least one memory having stored therein instructions which when executed by any set of the one or more processors, perform a process for document data extraction template management, the process for document data extraction template management including:

receiving data extraction template data representing a data extraction template associated with a specific source document type;

determining a field hit count number associated with the data extraction template, the field hit count number indicating the number of data fields from which data can be extracted from the specific source document type using the data extraction template;

using the data extraction template to extract data from received source documents of the specific source document type;

monitoring the acceptance or rejection of data extracted from received source documents of the specific source document type using the data extraction template;

determining a data acceptance count to be associated with the data extraction template, the data acceptance count indicating the number of times the data extracted from received source documents of the specific source document type using the data extraction template is accepted;

transforming the field hit count number associated with the data extraction template and the data acceptance count associated with the data extraction template into data extraction template ranking score data for the data extraction template;

saving the data extraction template data and the data extraction template ranking score data for the data extraction template as ranked data extraction template data; and aggregating ranked data extraction template data associated with two or more data extraction templates associated with the specific source document type.

18. The system for document data extraction template management of claim 17 wherein the data extraction template data representing a data extraction template associated with a specific source document type is received from users of a data management system associated with the efficient and scalable data extraction template management system.

19. The system for document data extraction template management of claim 18 wherein the data management system is a financial management system.

20. The system for document data extraction template management of claim 17 further comprising:
   when a source document of the specific source document type is received, the two or more data extraction templates associated with the specific source document type are used in the order of highest data extraction template ranking scores to extract data from the source document until all of the desired data is extracted from the source document.

21. The system for document data extraction template management of claim 20 further comprising:
   increasing the data acceptance count associated with a data extraction template used to extract accepted data from the source document.

22. The system for document data extraction template management of claim 21 further comprising:
   transforming the data extraction template ranking score associated with the data extraction template used to extract accepted data from the source document to reflect the increase in the data acceptance count associated with the data extraction template used to extract accepted data.

23. The system for document data extraction template management of claim 17 further comprising:
   determining a threshold number of data extraction templates associated with a specific document type; and
   once the threshold number of data extraction templates associated with the specific document type is attained, eliminating a data extraction template associated with the specific document type having a lowest data extraction template ranking score before a new data extraction template associated with the specific document type is added.

24. The system for document data extraction template management of claim 17 further comprising:
   determining a threshold data extraction template ranking score; and
   eliminating data extraction templates associated with the specific document type having a data extraction template ranking score below the threshold data extraction template ranking score.

* * * * *